Oct. 1, 1935.  W. P. SCHMITTER  2,016,248
VARIABLE SPEED TRANSMISSION
Filed March 25, 1933   2 Sheets-Sheet 2
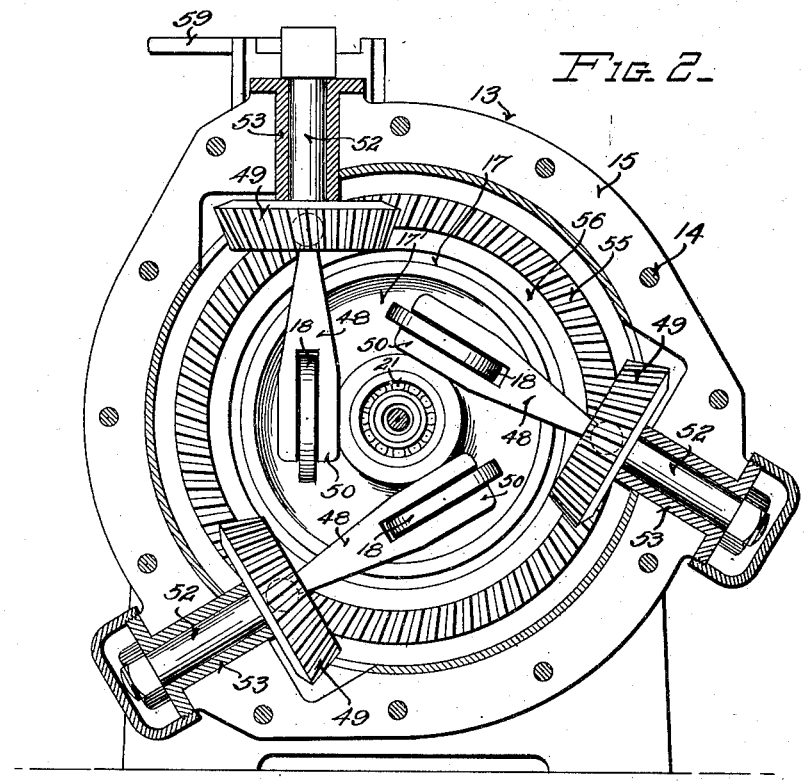
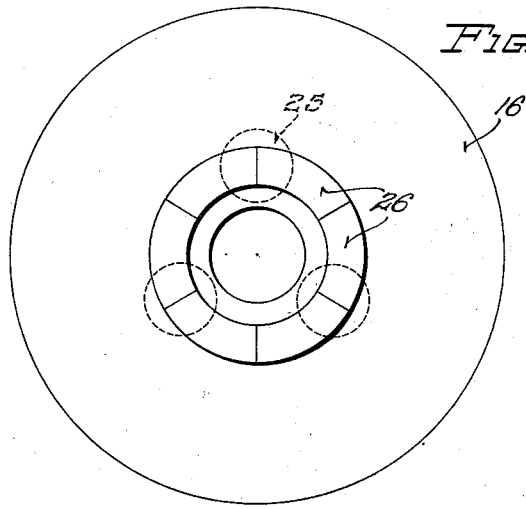
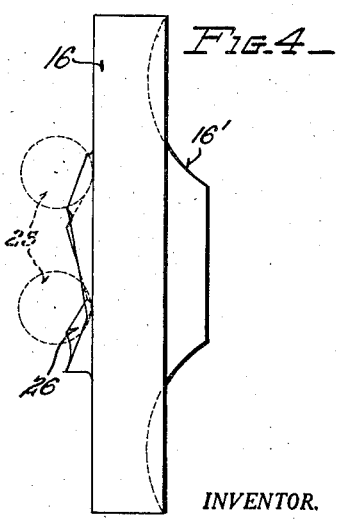
INVENTOR.
WALTER P. SCHMITTER
BY
ATTORNEYS.

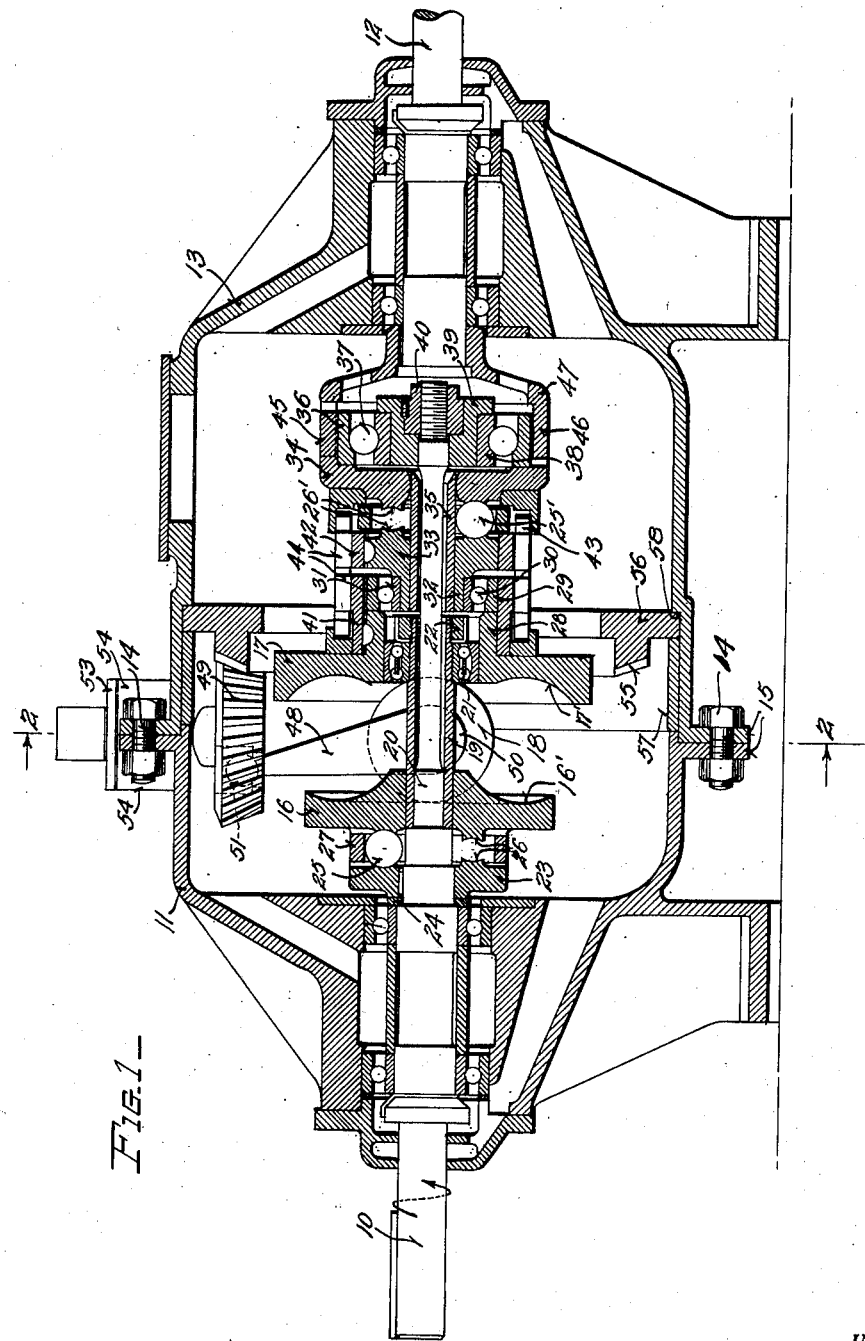

Patented Oct. 1, 1935

2,016,248

UNITED STATES PATENT OFFICE 2,016,248

VARIABLE SPEED TRANSMISSION

Walter P. Schmitter, Milwaukee, Wis., assignor to The Falk Corporation, Milwaukee, Wis., a corporation of Wisconsin Application March 25, 1933, Serial No. 662,692

6 Claims. (Cl. 74—200)

This invention relates to variable speed power transmissions of the adhesion type, wherein the power is transmitted from a driving to a driven disk through interposed rollers in contact therewith, and wherein the speed relation between the disks is determined by the angular relation between the roller and disk axes.

Transmissions of this type are commonly equipped with torque responsive devices intended to produce the required contact pressures between the rollers and disks in such manner as to proportion those pressures to the load requirements and thereby avoid heavy duty contact pressures except when required. As heretofore arranged such devices function satisfactorily when the torque changes are relatively slow or gradual, but when the torque is suddenly increased they fail to increase the contact pressures with sufficient promptness to prevent slippage between the disks and rollers. This is a common cause of premature wear and sometimes serious damage to the contact surfaces.

One object of the present invention is the provision in a power transmission of the character mentioned of torque responsive means which will invariably function to increase the contact pressures before the corresponding increase in torque load reaches the contact surfaces. In the transmission hereinafter described, this is accomplished by an arrangement which will delay the transmission of a torque increase to the contact surfaces and thereby afford ample time in which to effect the required increase in pressure between those surfaces before the increased torque reaches them.

Another object is the provision of torque responsive pressure regulating means which will invariably function to provide the required changes in contact pressure, regardless of whether the torque fluctuations enter the transmission from the driving or driven end. This I accomplish by the use of two pressure producing devices at the opposite ends of the transmission and so related that each may function satisfactorily without interference by the other. In the transmission hereinafter described, one of such devices is designed and arranged to regulate the contact pressures in accordance with those relatively slow torque changes which ordinarily originate in the driver, while the other is preferably arranged and designed to regulate the contact pressures in accordance with those relatively rapid or shock-like torque fluctuations which ordinarily originate in the driven mechanism.

Another object is the provision in a transmission of the character mentioned of a novel combination and arrangement of parts for equalizing the contact pressures between the several rollers and disks in an improved manner.

Another object is the provision of a novel combination and arrangement of parts by which the contact pressures and consequent end thrust loads are sustained in an improved manner by the active parts of the transmission. This arrangement avoids the necessity of employing a heavy duty casing and results in a transmission unit of relatively light weight.

Other more specific objects and advantages will appear from the following description of an illustrative embodiment of the present invention.

In the accompanying drawings:—

Figure 1 is a longitudinal sectional view of a variable speed transmission constructed in accordance with the present invention.

Fig. 2 is a transverse sectional view taken along the line 2—2 of Fig. 1.

Figs. 3 and 4 are front and side elevations, respectively, of the driving disk, illustrating particularly the pressure producing cam surfaces.

In the power transmission mechanism shown, a drive shaft 10 is journalled in the forward end-section 11 of a two-part housing, and a driven shaft 12 is journalled in the rear end-section 13 of the housing. The housing sections are separably joined by appropriate means, such as bolts 14 which pass through abutting flanges 15 on the housing sections.

The drive shaft 10 supports both the driving and driven disks 16 and 17 and also serves to sustain the contact pressures between the disks and interposed rollers 18.

In this instance the driving disk 16 is rotatably fitted on one end of a sleeve 19, pressed onto a reduced portion 20 of the drive shaft 10; and the driven disk 17 is mounted upon a swivel type anti-friction bearing 21, fixed to the other end of the sleeve 19 by appropriate means, such as a nut 22.

The rollers 18 are confined by and between concentric toric raceways 16' and 17', formed in the opposed faces of the disks 16 and 17, and rotate about their individual axes, which are adjustably fixed preferably in a manner to be hereinafter described. The arrangement is such that individual rotation imparted to the rollers 18 by rotation of the disk 16 causes rotation of the disk 17 in a direction opposite to that of the disk 16 and at a relative rate regulatable by adjustment of the roller axes.

The disk 16 is driven from the shaft 10 through mechanism designed to impose an axial pressure on the disk in proportion to the torque transmitted from the shaft. In this instance the mechanism for this purpose comprises a disk 23, keyed or otherwise fixed to the shaft 10 and engaged with a thrust collar 24 on the shaft; together with a series of thrust transmitting balls 25, preferably three in number, interposed between the disks 23 and 16. The balls 25 are confined between sinuous cam surfaces 26, formed on the opposed faces of the disks, and radially retained by a ring 27 surrounding them. The cam surfaces 26 are preferably transversely curved to match the balls and thus provide line contact therewith.

The arrangement is such that under no-load condition, each of the balls 25 assumes a position between low portions of the opposed cam surfaces 26, and when a torque is transmitted to the disk 23, tending to rotate that disk relative to disk 16, the balls react against the inclined portions of the cam surfaces, thereby passing the disk 16 axially against the rollers 18 and also urging the disk 16 to rotate. The balls 25 and cam surfaces 26 thus coact to perform the dual function of transmitting the torque from one disk to the other and of imposing an axial thrust upon the disk 16, thereby producing the required contact pressures between that disk and the rollers 18.

The axial thrust produced by the balls 25 and cam surfaces 26 is transmitted through the disk 16 and rollers 18 to the disk 17, thereby producing the required contact pressures between the disk 17 and rollers 18.

In the transmission shown, the hub 28 of the disk 17 bears against the outer race ring 29 of a thrust sustaining ball bearing 30 whose inner race ring 31 is mounted upon the hub 32 of a disk 33 to which reference will again be made hereinafter. A thrust producing mechanism, like that hereinabove described and including three balls 25' confined between cam surfaces 26', is interposed between the disk 33 and a disk 34. The disk 34 is centered relative to the disk 33 preferably by a tube 35, which extends from the disk 33 and upon which the disk 34 is rotatably and rockably mounted. The disk 34 bears against the outer race ring 36 of a thrust sustaining ball bearing 37 whose inner race ring 38 is carried by a thrust collar 39, removably fixed to the inner end of the shaft 10 by appropriate means such as a nut 40.

It will thus be noted that the thrust reactions, resulting from the contact pressures between the disks 16 and 17 and interposed rollers 18, are sustained by the shaft 10, independently of the casing, the thrust reaction from disk 16 being transmitted to the thrust collar 24 on the shaft through the balls 25 and disk 23, and the thrust reaction from the disk 17 being transmitted to the thrust collar 39 on the shaft through the bearing 30, disk 33, balls 25', disk 34, and bearing 37. With the casing thus relieved of the axial thrust loads, it may be of lighter construction than would otherwise be required.

The disk 17 is connected in driving relation with the driven shaft 12 through connections, which include the pressure-producing torque-transmitting balls 25' and cam surfaces 26', on the disks 33 and 34, so that the elements last named react to increase the contact pressures between the disks 16 and 17 and rollers 18 in response to sudden increases in torque load on the driven shaft 12.

The connections, just mentioned, also include a resilient driving connection between the disk 17 and the disk 33, designed to delay the transmission of such torque load increases to the rollers 18 and disks 16 and 17, and thereby assure the required increase in contact pressures between the rollers and disks before the increase in torque load reaches those elements. The resilient connection shown for that purpose comprises a torsionally resilient coupling, of a well known type, including a pair of rings 41 and 42 keyed or otherwise fixed, respectively, to the hubs 28 and 32 of the disks 17 and 33, and a grid-like member having resilient limbs 43 engaged within aligned grooves 44 formed in the peripheries of the rings 41 and 42.

The driving connections between the disk 17 and shaft 12 also include a coupling of a well known type of which the disk 34 forms a part. The coupling shown comprises a series of lugs 45 projecting from the disk 34 and intermeshed with a series of lugs 46 on a disk 47 keyed or otherwise fixed to the shaft 12. This coupling provides a positive driving connection between the disk 34 and shaft 12 and at the same time permits a slight radial displacement and tilting of the disk 34 relative to the shaft 12, that portion 10' of the drive shaft 10 being reduced to provide the flexibility necessary for such action of the disk 34. This floating condition of the disk 34, together with the rockability of the disk 17 upon its bearing 21, assures an equalization of the contact pressures between the rollers 18 and disk 17, and consequently between the rollers 18 and disk 16, resulting from the axial thrusts imposed on those disks.

The inclination of the cam surfaces 26 on the disks 23 and 16 is such that the contact pressures between the rollers 18 and disks 16 and 17 normally respond to the torque transmitted through the drive shaft 10 and normally vary in accordance with variations in such torque. Those torque fluctuations, which originate in the driver and are transmitted through the shaft 10, are ordinarily rather slow or gradual, so that there is little danger of the rollers 18 and disks 16 and 17 being exposed to torque increases, originating from that source, before the pressure contacts therebetween are adequately increased by the automatic action of the balls 25 and cam surfaces 26. In any event the building up of torque reactions between the rollers 18 and disks 16 and 17 is delayed by the yieldability of the resilient coupling to which the disk 17 is connected, so that ample time is afforded in which to build up the contact pressures in anticipation of the increased torque.

The balls 25' and cam surfaces 26' on the disks 33 and 34 normally respond only to torque fluctuations which originate in the driven mechanism and which are transmitted through the shaft 12. Such fluctuations are usually much faster or sharper than those that originate in the driver. For that reason the inclination of the cam surfaces 26' is preferably somewhat steeper than the cam surfaces 26, so that the balls 26' ordinarily remain within the low portions of the cam surfaces 26' except when subjected to sudden fluctuations transmitted from the shaft 12.

The rollers 18 may be mounted and controlled in any known or approved manner. In this instance the rollers are supported and confined concentrically of, in, and by the toric raceways 16' and 17' in the disks 16 and 17. Each roller is individually controlled by a floating tongue or link 48 which is supported at one end by the roller and at its other end by a rotary element 49.

Each roller 18 is shown journalled within the inner bifurcated end 50 of the link 48, so that the axis of rotation of the roller is fixed with respect to the longitudinal axis of the link and preferably forms a right angle therewith.

The outer end of each link is connected to the element 49, at a point eccentrically thereof, through an appropriate universal joint, such as a ball and socket connection 51, so that the link and roller are free to turn about the longitudinal axis of the link and also free to tilt in response to rotation of the element.

Each element 49 is, in this instance, carried by a shaft 52, journalled in an appropriate bushing 53, which is confined between the two halves 54—54 of a split bearing hub provided on the casing sections 11 and 13. Each shaft 52 and its element 49 are preferably disposed to rotate about an axis which, if extended, would pass through the center of its associated roller 18.

Due to the eccentric connection of each link 48 with its control element 49, the longitudinal axis of the link is angularly disposed with respect to the axis of rotation of the element 49, and this angularity is in such direction that the link axis extends from its associated roller 18 toward that portion of the driving disk 16 which is approaching the roller. With the parts thus arranged, it has been found that, during operation of the transmission, each roller 18 promptly responds to every rotative adjustment of its control element 49 in such manner as to substantially maintain the plane of rotation of the roller substantially coincident with that plane passing through the longitudinal axes of the link 48 and the shaft 52. That is to say, whenever the element 49 is rotated in one direction or the other, so as to change the inclination of that plane which passes through the axes of the link 48 and shaft 52, the associated roller 18 promptly adjusts itself until its plane of rotation is similarly inclined. Each such adjustment effects a definite change in the speed ratio between the driving and driven disks 16 and 17.

It is of course understood that the several control elements 49 are simultaneously operated and controlled. In this instance each element 49 is in the form of a hypoid bevel gear, and all mesh with a mating bevel gear 55 which is carried by a ring 56 rotatively confined between a spacer ring 57 and shoulder 58 in the casing section 13. One of the gears 49 is directly controlled by an appropriate hand lever 59 fixed to its shaft 52, the other gears 49 being controlled by and through the common mating gear 55.

Various changes may be made in the embodiment of the invention hereinabove specifically described without departing from or sacrificing the advantages of the invention as defined in the appended claims.

I claim:

1. A power transmission comprising driving and driven coaxial disks, interposed torque transmitting rollers in rolling contact therewith, torque responsive means for automatically regulating the contact pressures between said rollers and disks, and means connected in series with said last named means and said disks for delaying the transmission of torque increases to said rollers and disks until said contact pressures have been correspondingly increased.

2. A power transmission comprising driving and driven coaxial disks, interposed torque transmitting rollers in rolling contact therewith, torque responsive means for automatically regulating the contact pressures between said rollers and disks, and resilient torque transmitting means connected in series with said last named means and said disks for delaying the transmission of torque fluctuations to said rollers and disks to thereby prevent the transmission of torque increases thereto until said contact pressures have been correspondingly increased.

3. A power transmission comprising driving and driven coaxial disks, interposed torque transmitting rollers in rolling contact therewith, torque responsive means for automatically regulating the contact pressures between said rollers and disks, said means including a torque responsive thrust producing device and thrust transmitting connections between said device and one of said disks, and resilient torque transmitting connections between said device and said last mentioned disk.

4. A power transmission comprising driving and driven coaxial disks, interposed torque transmitting rollers in rolling contact therewith, a torque responsive thrust producing device, thrust transmitting connections between said device and one of said disks, resilient torque transmitting connections between said device and said last mentioned disk, a second torque responsive thrust producing device, and thrust transmitting connections between said last named device and the other of said disks.

5. A power transmission comprising driving and driven coaxial disks, interposed torque transmitting rollers in rolling contact therewith, a shaft connected in driving relation with one of said disks, said shaft having an unsupported flexible extension, thrust mechanism interposed between the end of said shaft extension and said other disk for maintaining the required contact pressures between said rollers and disks, a second shaft and flexible means connecting said second shaft in driving relation with said last mentioned disk.

6. A power transmission comprising driving and driven coaxial disks, interposed torque transmitting rollers in rolling contact therewith, a shaft having a thrust sustaining driving connection with one of said disks, said shaft also having an unsupported flexible extension projecting through the other of said disks, a thrust sustaining connection between said flexible extension and the last mentioned disk, a second shaft, and driving means including a flexible coupling between said second shaft and said last mentioned disk.

WALTER P. SCHMITTER.